(12) United States Patent
Tham et al.

(10) Patent No.: US 11,733,394 B2
(45) Date of Patent: Aug. 22, 2023

(54) POSITIONING METHOD AND DEVICE FOR GROWING TREES, CONSTRUCTION ELEMENTS OR GEOLOGICAL FEATURES

(71) Applicant: Katam Technologies AB, Malmö (SE)

(72) Inventors: Krister Tham, Lund (SE); Magnus Kåreby, Bjärred (SE); Linus Mårtensson, Malmö (SE)

(73) Assignee: Katam Technologies AB, Malmö (SE)

( * ) Notice: Subject to any disclaimer, the term of this patent is extended or adjusted under 35 U.S.C. 154(b) by 1364 days.

(21) Appl. No.: 16/079,258

(22) PCT Filed: Feb. 27, 2017

(86) PCT No.: PCT/SE2017/050182
§ 371 (c)(1),
(2) Date: Aug. 23, 2018

(87) PCT Pub. No.: WO2017/146641
PCT Pub. Date: Aug. 31, 2017

(65) Prior Publication Data
US 2019/0045726 A1  Feb. 14, 2019

(30) Foreign Application Priority Data

Feb. 26, 2016  (SE) .................................. 1630035-2

(51) Int. Cl.
*G01S 19/39*  (2010.01)
*G01S 19/40*  (2010.01)
(Continued)

(52) U.S. Cl.
CPC ............ *G01S 19/396* (2019.08); *G01B 11/02* (2013.01); *G01B 11/14* (2013.01); *G01S 19/38* (2013.01);
(Continued)

(58) Field of Classification Search
CPC ........ G01S 19/396; G01S 19/38; G01S 19/40; G01S 19/42; G01S 19/45; G01S 19/51;
(Continued)

(56) References Cited

U.S. PATENT DOCUMENTS 5,528,518 A * 6/1996 Bradshaw ............ G09B 29/106
702/158
9,325,861 B1 * 4/2016 Ettinger ............. H04N 5/23238
(Continued)

FOREIGN PATENT DOCUMENTS

EP       2216657 A1    8/2010
JP    2008-079549 A    4/2008
(Continued)

OTHER PUBLICATIONS

Tsubouchi, T. et al., "Tree Information Measuring Method, Tree Information Measuring Device, and Program", English translation of WO2010032495 A1, published Mar. 25, 2010.*
(Continued)

*Primary Examiner* — Xuemei G Chen
(74) *Attorney, Agent, or Firm* — Renner, Otto, Bolsselle & Sklar, LLP

(57) ABSTRACT

A device measures positions of a plurality of objects. The device comprises a memory arranged to store positioning data for a plurality of objects having mutual constant positions, an input interface arranged to obtain measurement data of relative positions for at least a subset of the plurality of objects, and a processor arranged to calculate an adapted measurement position for at least one of the objects of the subset of the plurality of objects by correlating the measured relative positions for the at least a subset of the plurality of objects with the acquired positioning data. The adapted
(Continued)

measurement position is based on the positioning data. Corresponding method and computer program are also disclosed.

13 Claims, 6 Drawing Sheets

(51) Int. Cl.
*G01S 19/45* (2010.01)
*G01S 19/51* (2010.01)
*G01S 19/53* (2010.01)
*G01B 11/02* (2006.01)
*G01B 11/14* (2006.01)
*G01S 19/42* (2010.01)
*G01S 19/38* (2010.01)
*G06T 7/00* (2017.01)

(52) U.S. Cl.
CPC .............. *G01S 19/40* (2013.01); *G01S 19/42* (2013.01); *G01S 19/45* (2013.01); *G01S 19/51* (2013.01); *G01S 19/53* (2013.01); *G06T 7/0002* (2013.01); *G06T 2207/10032* (2013.01)

(58) Field of Classification Search
CPC ......... G01S 19/53; G01B 11/02; G01B 11/14; G01B 11/002; G06T 7/0002; G06T 2207/10032; G06T 1/0007; G06T 7/70; A01G 23/00
See application file for complete search history.

(56) References Cited

U.S. PATENT DOCUMENTS

| | | | |
|---|---|---|---|
| 2004/0236535 A1 | 11/2004 | Hyyppa et al. | |
| 2006/0071950 A1* | 4/2006 | Kurzweil | G06V 30/1475 345/698 |
| 2006/0096667 A1 | 5/2006 | Stevens et al. | |
| 2009/0216432 A1* | 8/2009 | Svane | G01S 19/51 342/357.56 |
| 2010/0074555 A1* | 3/2010 | Diaz | G06V 20/176 382/284 |
| 2013/0010070 A1* | 1/2013 | Tateno | B25J 9/1697 901/14 |
| 2013/0325346 A1 | 12/2013 | McPeek | |
| 2014/0146173 A1* | 5/2014 | Joyce | G06V 20/13 348/144 |
| 2014/0257595 A1* | 9/2014 | Tillmann | B64C 39/024 701/2 |
| 2015/0070523 A1* | 3/2015 | Chao | G06T 5/50 348/218.1 |
| 2015/0253123 A1* | 9/2015 | Braker | G01B 11/2531 356/610 |
| 2015/0332500 A1* | 11/2015 | France | G06T 19/006 345/633 |
| 2016/0048973 A1* | 2/2016 | Takenaka | G06T 7/73 382/199 |
| 2016/0212338 A1* | 7/2016 | Seok | G06T 3/4038 |
| 2016/0283955 A1* | 9/2016 | Terrazas | G06Q 30/0205 |
| 2016/0358190 A1* | 12/2016 | Terrazas | G06F 16/29 |
| 2017/0006220 A1* | 1/2017 | Adsumilli | G06V 40/168 |
| 2017/0068840 A1* | 3/2017 | Chaki | G06T 7/0002 |
| 2017/0148175 A1* | 5/2017 | Liu | H04N 5/247 |
| 2017/0178372 A1* | 6/2017 | Gormish | G06K 9/6215 |
| 2021/0217231 A1* | 7/2021 | Hu | G06T 17/20 |

FOREIGN PATENT DOCUMENTS

| | | |
|---|---|---|
| WO | 02071832 A1 | 9/2002 |
| WO | 2010/032495 A1 | 3/2010 |

OTHER PUBLICATIONS

International Search Report for corresponding International Application No. PCT/SE2017/050182 dated May 24, 2017.
Written Opinion of the International Searching Authority for corresponding International Application No. PCT/SE2017/050182 dated May 24, 2017.
Office Action received in corresponding Swedish Application No. 1630035-2 dated Oct. 28, 2016.
Office Action received in corresponding Swedish Application No. 1630035-2 dated May 24, 2017.
Supplementary European Search Report for corresponding European Application No. 17756925.8 dated Aug. 23, 2019.

* cited by examiner

POSITIONING METHOD AND DEVICE FOR GROWING TREES, CONSTRUCTION ELEMENTS OR GEOLOGICAL FEATURES

This application is a national phase of International Application No. PCT/SE2017/050182 filed Feb. 27, 2017, and claims priority to Swedish Application No. 1630035-2 filed on Feb. 26, 2016, which is incorporated herein by reference.

TECHNICAL FIELD

The present invention generally relates to methods, devices and computer programs for positioning. In particular, the invention relates to a method, device and computer program for acquiring positioning data for a plurality of objects, and to a method, device and computer program for adjusting positioning data.

BACKGROUND

A popular approach for positioning in e.g. rural areas, is to use satellite-based positioning systems, sometimes referred to as Global Navigation Satellite Systems, GNSS. Different activities are enhanced by accurate positioning, e.g. forestry, agriculture, construction and geological activities. The requirements on accuracy depend on the particular activity, but better accuracy normally provides for more efficient ways of performing the activities, e.g. enhancing automation.

For example, in today's forestry industry the trees in a forest are handled as groups of trees, assuming that all trees within a group have more or less the same characteristics. With today's inventory methods, a group of trees normally are quite big (>1 ha). The assumption that all trees have some characteristics is very rough and there is no control of each individual tree. This means that the ground potential is not fully utilized and at the end it leads to production loss. By developing methods that makes it possible to manage each tree individually, the forest production could be significantly improved. In order to handle trees individually, each tree need to have a unique identity. A tree identity parameter could be the exact geographical position. The problem is that the today's satellite-based positioning systems, e.g. the GPS system, have too bad accuracy at the forest ground level for unique identification of each individual tree position. Similar issues may be present in other environments, e.g. among tall buildings, submerged environments, etc.

This invention is about how to achieve geographical position for individual objects with higher accuracy.

SUMMARY

The present invention is based on the inventor's realization that the likelihood for achieving good accuracy from satellite-based positioning systems are larger at a place where line-of-sight to the satellites providing positioning enabling signals, while the place where activities depending on the positioning may not have good line-of-sight towards the satellites. The principle of this invention is based on registration, e.g. imaging, of a plurality of objects from the place where line-of-sight is ascertained, and registration of at least a subset of the objects from the place where the activities are conducted, and where both the registrations are used for acquiring better accuracy in positioning when performing the activities. Thus, a pattern of the objects is used as a signature, which is the same for both registrations for the subset of the objects, to be recognized for improving positioning of respective object at the site for the activities.

According to a first aspect, there is provided a method of adjusting positioning data. The method comprises acquiring positioning data for a plurality of objects having mutual constant positions, measuring relative positions for at least a subset of the plurality of objects, and calculating an adapted measurement position for at least one of the objects of the subset of the plurality of objects by correlating the measured relative positions for the at least a subset of the plurality of objects with the acquired positioning data.

The acquired positioning data may be a file comprising the positions for the respective object, wherein the positions may be determined from a higher altitude than from the altitude on which the measurement of the relative positions for the at least a subset of the plurality of objects is made.

The measuring of the relative positions for the at least a subset of the objects may comprise measuring mutual distances and directions between individual objects. The measuring of the distances between the individual objects may comprise registering the objects by a camera, triangulation between the objects, or laser scanning of the objects, or any combination thereof. The method may further comprise interaction, for adapting the measurement, by a user.

The objects may be any one or more of growing trees, construction elements, and geological features.

At least one of the objects may comprise a removed object providing a registerable sign of the removal.

According to a second aspect, there is provided a method of acquiring positioning data for a plurality of objects. The method comprises acquiring an image of the plurality of objects, identifying respective object from the image, determining a position of an apparatus acquiring the image, determining a position relationship between the respective object and the determined position, and assigning a position estimate for each of at least a subset of the identified objects.

The image may be acquired by photographic imaging, or laser scanning, or a combination thereof.

The determining of the position of the apparatus acquiring the image may include receiving signals from a satellite-based navigation system and calculating the position from the received signals.

The determining of the position relationship between the respective object and the position of the apparatus acquiring the image may include determining a direction and a distance between the apparatus and the respective object.

The objects may be any one or more of growing trees, construction elements, and geological features.

At least one of the objects may comprise a removed object providing a registerable sign of the removal.

According to a third aspect, there is provided a computer program comprising computer executable instructions which when downloaded an executed by a processor of a device for measuring positions of a plurality of objects causes the device to perform the method of the first aspect.

According to a fourth aspect, there is provided a computer program comprising computer executable instructions which when downloaded an executed by a processor of a device for providing position data of a plurality of objects causes the device to perform the method of the second aspect.

According to a fifth aspect, there is provided a device for measuring positions of a plurality of objects. The device comprises a memory arranged to store positioning data for a plurality of objects having mutual constant positions, an input interface arranged to obtain measurement data of relative positions for at least a subset of the plurality of objects, and a processor arranged to calculate an adapted measurement position for at least one of the objects of the subset of the plurality of objects by correlating the measured relative positions for the at least a subset of the plurality of objects with the stored positioning data.

The positioning data may be acquired as a file, having data suitable to be stored in the memory, comprising the positions for the respective object, wherein the positions may be determined from a higher altitude than from the altitude on which the measurement of the relative positions for the at least a subset of the plurality of objects is made.

The measurement of the relative positions for the at least a subset of the objects may include mutual distances and directions between individual objects. The input interface may be connected to a camera arranged to register the objects, an optical instrument arranged to determine the mutual distances and directions by triangulation between the objects, a laser scanner arranged to scan the objects, or a user interface, or any combination thereof. Any one of the camera, the optical instrument, the laser scanner and the user interface may be a part of the device. Any one of the camera, the optical instrument and the laser scanner may be a remote entity connected to the device. The user interface may be arranged to enable interaction by a user for adapting the measurement data.

The objects may be any one or more of growing trees, construction elements, and geological features.

At least one of the objects may comprise a removed object providing a registerable sign of the removal.

According to a sixth aspect, there is provided a device for providing position data of a plurality of objects. The device comprises an interface arranged to acquire an image of the plurality of objects, a position of an apparatus acquiring the image, and a position relationship between the respective object and the determined position, an image processing device arranged to identify respective object from the image, a processor arranged to assign a position estimate for each of at least a subset of the identified objects by calculating the position estimates from the position of the apparatus and the position relationship to the respective object.

The image may be acquired by photographic imaging, or laser scanning, or a combination thereof.

The position of the apparatus acquiring the image may be determined by receiving signals from at least a satellite-based navigation system and calculating the position from the received signals.

The position relationship between the respective object and the position of the apparatus acquiring the image may be determined from a measured direction and a measured distance between the apparatus and the respective object.

The objects may be any one or more of growing trees, construction elements, and geological features.

At least one of the objects may comprise a removed object providing a registerable sign of the removal.

The manner taught herein also solves a problem of how to match two surveyed areas as discussed below, and it is therefore an object of the present invention to provide a method for matching a first area to a second area, wherein said first and second areas correspond to surveyed areas and each comprises at least one object, the method comprises receiving said first area; receiving said second area; finding a first set of objects in said first area; finding a matching second set of objects in said second area; and stitching together said first area with said second area by overlaying said first and second sets.

It is also an object of the teachings herein to provide a computer program comprising computer executable instructions which when downloaded and executed by a processor of a device causes the device to perform a method as above and also as below.

It is also an object of the teachings herein to provide a device for matching a first area to a second area, wherein said first and second areas correspond to surveyed areas and each comprises at least one object, the device comprising a processor arranged for receiving said first area; receiving said second area; finding a first set of objects in said first area; finding a matching second set of objects in said second area; and stitching together said first area with said second area by overlaying said first and second sets.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings.

DETAILED DESCRIPTION

The invention utilizes the fact that objects in question, e.g. a tree, construction, etc. has a very constant position. Objects having a constant position from year to year, e.g. during tree life time, enables that the two registrations does not need to be made simultaneously. Other features of the objects, such that a tree bole normally is very straight, may also be relied on. Since there inherently is variation of the individual distances between different objects, a signature based on their mutual positions can be achieved. For example, even if a forest is planted, there are very often at least small position variations due to e.g. topographic ground variations. The similar normally also applies to other objects.

The invention also utilizes the fact that it is possible to get high accuracy of tree positions from airplanes (or similar aircrafts) flying above the forest. Above the forests there is normally very good connectivity to satellites of a GNSS.

Another example is a submerged scenario where GNSS signals rapidly become weak as the depth increases. In that example, the reference to "ground level" in the explanations below would mean the "submerged level".

Figure 1:
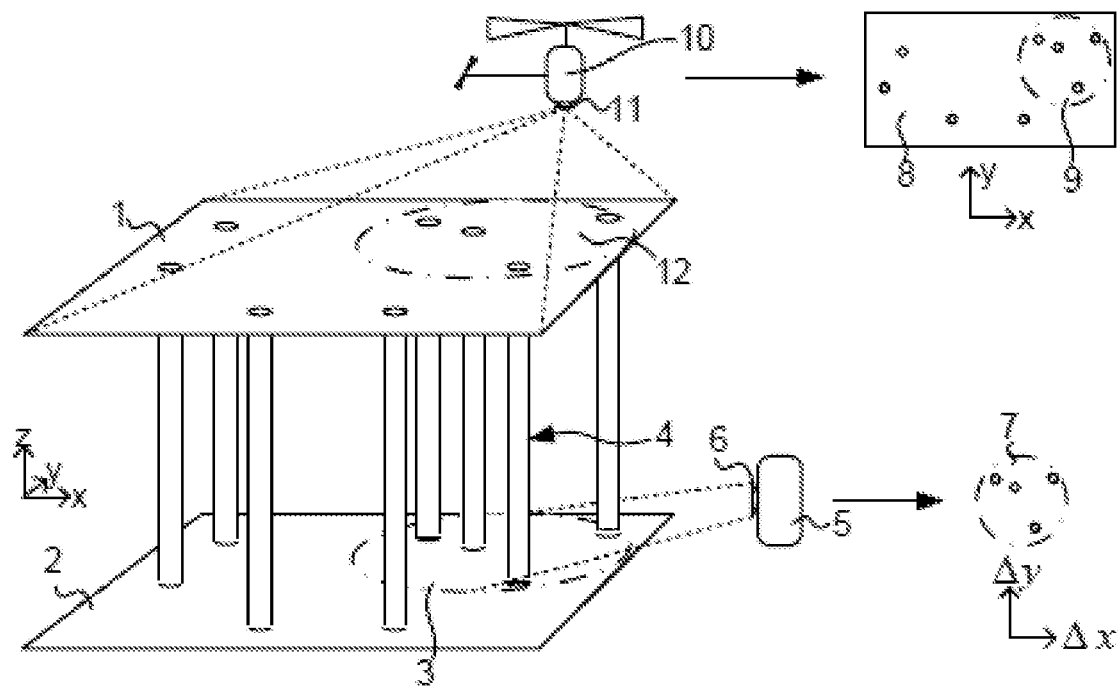
FIG. 1 schematically illustrates a principle including a first device, a second device and a set of objects.

FIG. 1 illustrates the principle. An area 1, 2 holds a plurality of objects 4. A first registration 8 of the objects 4 is made by a first device 10, which comprises registration and measurement means 11. The registration and measurement means 11 registers the objects 4 in the area 1 and can assign positions for respective object 4 by measuring direction and distance to the objects and based on its own accurately determined position, which can be accurately determined since the first device 10 has line-of-sight to satellites of a GNSS. At ground level, the area 2 holds the same objects 4. A second device 5 comprises registration and measurement means 6. A subset of the objects within a sub-area 3 of the area 2 is registered. A second registration 7 of the subset of the objects is thus achieved. By comparing the second registration 7 with the first registration 8, the subset of objects can be recognized, and since their positions are accurately determined by the first device 10, the second device 5 is enabled to acquire accurate positions for the respective objects. The comparison of the registrations may be resembled with comparisons made in for example biometric comparisons, and the similar techniques may be used. Here, it can also be noted that the second device may provide at least a coarse positioning, which narrows down the subarea of the first registration 8 that needs calculations, i.e. enhances translation issues, and also measure direction used for the second registration 7, which narrows down calculations related to the direction, i.e. enhances rotation issues. For example, the second device 5 may comprise a compass and/or a gyro. Here, a further effect may be obtained. By the second device 5 being able to determine its mutual position to the subset of the objects, an accurate position for the second device 5 can also be determined. According to one embodiment, this may be the desired effect while the accurate positions of the objects may be considered as an intermediate result. In FIG. 1 there is also indicated reference directions x-y-z, which will be used in the discussion below. In short, the z-direction is the altitude or the vertical direction, and the x-y-plane is the plane in which comparisons of the registrations are made. Consider for example an inclination at ground level, where the positions of the objects are projected on the x-y-plane, or objects not being fully vertical. This will be further discussed below.

With the principles briefly discussed, the invention will now be discussed with reference to different embodiments and variants thereof.

Figure 2:
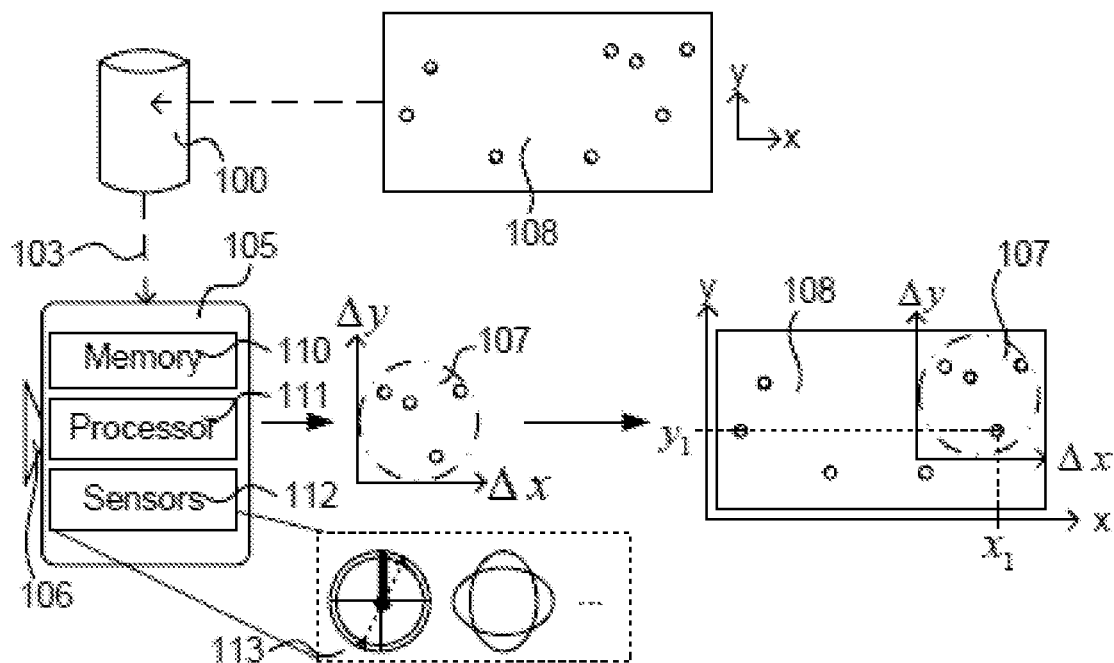
FIG. 2 schematically illustrates a principle of calculating an adapted positioning estimate.

FIG. 2 illustrates acquiring of the accurate positions at a ground device. A first registration 108 of objects and their positions is stored in a storage element 100. The first registration 108 is made by a first device at some point in time, where the first device is considered to be able to do accurate positioning, e.g. by operating on a higher altitude and thereby gaining from ensured line-of-sight for positioning by a GNSS and possibly additionally by other reference points and/or correction signals. The storage element 100 may be a database which is located internally in or externally from a second device 105. An external database 100 can be accessed in different ways, e.g. through wireless networks and/or the Internet, and may be implemented using known techniques both for storage and access, e.g. server, cloud technology, web solutions, etc.

The second device 105 is thus in possession of the data of the first registration 108. The second device 105 comprises registration means 106, e.g. a camera, laser scanner, etc., which is arranged to register objects in vicinity of the second device 105 when in use. The second device 105 preferably comprises a memory 110 and a processor 111 for handling a second registration 107 of the objects, which objects are at least coarsely given positions by estimating a position of the first device 105 and the mutual positioning between respective object and the second device 105. For giving the coarse positions, the second device 105 comprises one or more sensors 112 among which a positioning estimator, e.g. using positioning through a GNSS, is the most important. Here, the second device 105 is best suited of estimate the mutual positioning between the objects, while the absolute positions cannot be ensured to be that accurately determined since the second device 105 is intended to be used at ground level and line-of-sight towards satellites of a GNSS therefore cannot be guaranteed. The accurate positions of the objects and/or the second device 105 are instead determined by comparing the second registration 107 with the first registration 108. By matching the objects of the second registration 107 to objects of the first registration 108, and thus identifying the respective objects registered at ground level, the coarse positions can be substituted by the positions given by the first registration 108 wherein the second device 105 can provide adapted positions for the observed objects, and, by knowing the mutual positioning between the objects and the second device 105, also the accurate position of the second device 105.

Upon making the registration by the second device 105, a user interface of the second device 105 may provide feedback to the user by indicating registered objects. This may for example be made by providing a hybrid image made from a registered image and an overlay indicating registered objects. This may for example enable the user to interact with the registration, for example by trying to improve the imaging, mark objects to remove from registration (for example a non-static object, such as brought equipment), mark or include removed objects (manually or from file comprising registered removed objects), mark objects that are not fully vertical, etc.

The comparison between the second registration 107 and the first registration 108 may use different techniques. Many of the matching techniques used in biometric matching, which provides a plurality of approaches within feature matching, may be used in a similar way in this context. This may for example include correlation, forming pairs or clusters of objects in the respective registrations 107, 108 with mutual distances and directions and comparing these, etc. As within other such matching approaches, the two registrations 107, 108 to be compared should be aligned as good as possible for facilitating matching. This includes translation and rotation in x-y plane as illustrated in FIGS. 1 and 2. The translation task is solved by the second device 105 providing the coarse positions of the objects, as discussed above. The rotation task may be solved by using further sensors 113, e.g. a compass, in the second device 105 and thus orienting the representation in the second registration accordingly. This will be further discussed with reference to FIG. 4. Further enhancements may be provided through other sensors 113, e.g. a gyro providing inclination data upon making the second registration and from that providing compensation for the inclination, i.e. deviation from the x-y plane. From this, the processor 111 of the second device 105 should be suitable for making some geometrical calculations. Vector and matrix calculations are well suited for these tasks, but pre-calculated values stored in look-up tables stored in the memory 110 may also be valuable aid.

Figure 3:
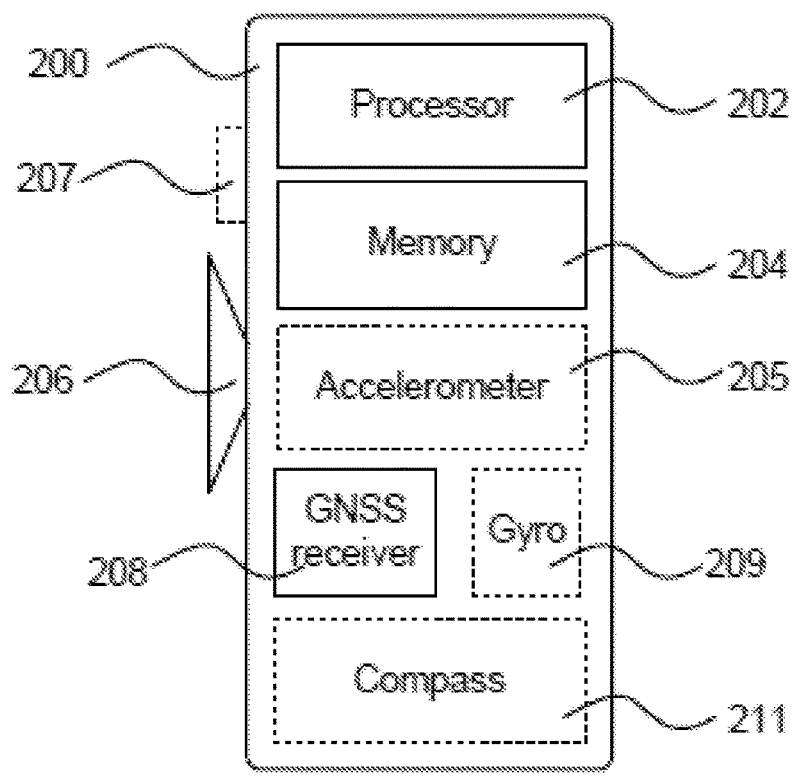
FIG. 3 is a block diagram illustrating a device according to an embodiment.

FIG. 3 illustrates a device 200. Here, it is to be noted that the illustration in FIG. 3 is applicable for both the first and the second devices as discussed above. The device 200 comprises a processor, memory 204, registration means 206 and a GNSS receiver 208. The GNSS receiver 208 provides a position for the device 200. The registration means 206, e.g. a camera and/or a laser scanner, makes a registration of a plurality of objects including mutual positions between the objects and the device 200. The processor 202 and memory 204 operates on data gathered by the GNSS receiver 208 and the registration means 206 as demonstrated with reference to FIGS. 1 and 2.

Further sensors such as an accelerometer 205, a gyro 209 and/or a compass 211 may be provided. The accelerometer 205 may provide data on movements of the device 200 when making the registration, and data from the accelerometer 205 may for example provide data for enhancing the registration by for example compensating for vibrations. The gyro 209 may provide data for compensating for different inclinations in the registration. The compass 211 may provide data for providing easier rotation alignment for making the comparison. Aggregation of data from the various sensors may provide for further enhancements on making a high-quality registration.

The device 200 may further comprise communication means 207, e.g. wired or wireless connection means. Wired connection means may for example comprise docking the device such that interaction, e.g. over a local area network or the Internet, with other devices, such as databases for storing or accessing registrations, is enabled. Wireless connection means may for example comprise personal area networks, wireless local area networks or wide area networks for providing similar effects as the wired networks are demonstrated to provide.

The second device 200 may also comprise a user interface providing feedback to the user, e.g. by indicating registered objects, and/or receiving input from the user, e.g. for enhancing the measurements. This may for example be made by providing a hybrid image as discussed above. Through the user interface, the user is able to interact with the registration, as also discussed above.

Figure 4:
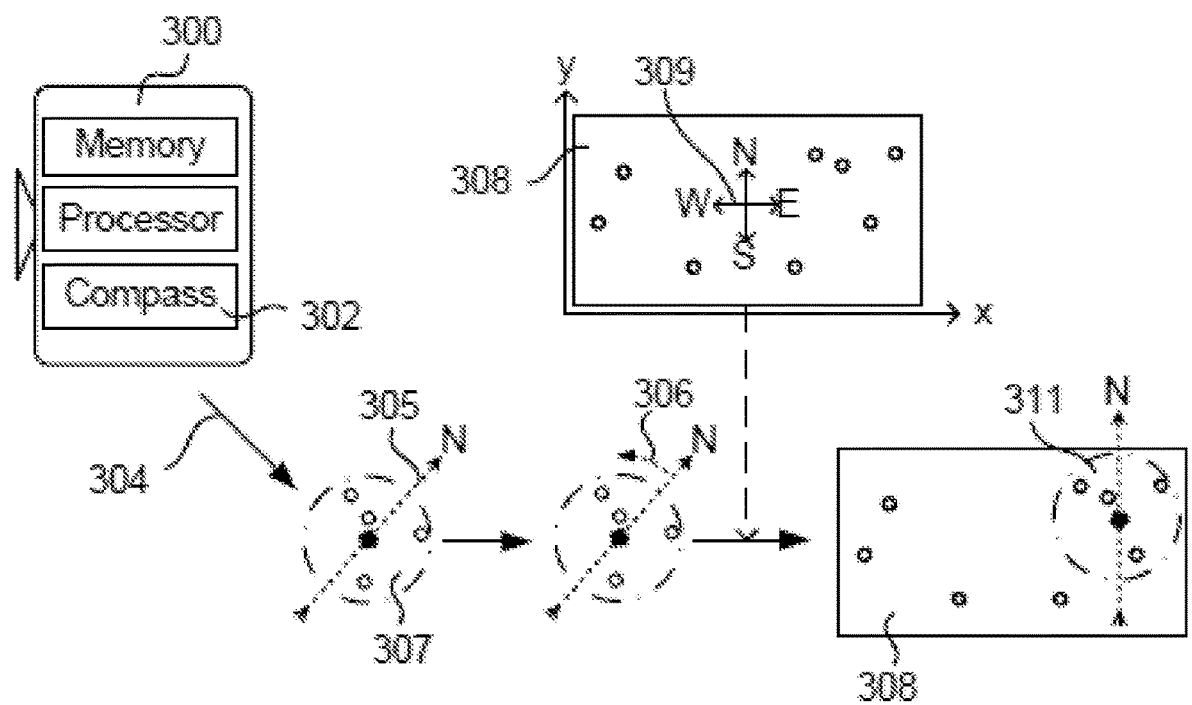
FIG. 4 schematically illustrates an embodiment which takes orientation of a device into account.

FIG. 4 illustrates acquiring of the accurate positions at a ground device 300, similar to FIG. 2 but with emphasis on providing proper rotation based on data from a compass 302 of the ground device 300. The basic principles are the same as those demonstrated with reference to FIG. 2 and are not repeated here for the sake of brevity.

Direction data 304 on the device 300 when making the second registration 307 and provided by the compass 302 is provided to the processor. A measured direction 305 for the registration is taken into account and a compensation 306 is made such that rotational alignment is made with coordinates 309 of the first registration 308. The representation of the respective positions of the second registration 307 is thus adapted to form a rotationally aligned registration 311 which then is compared with the first registration 308 according to what has been demonstrated above.

Figure 5:
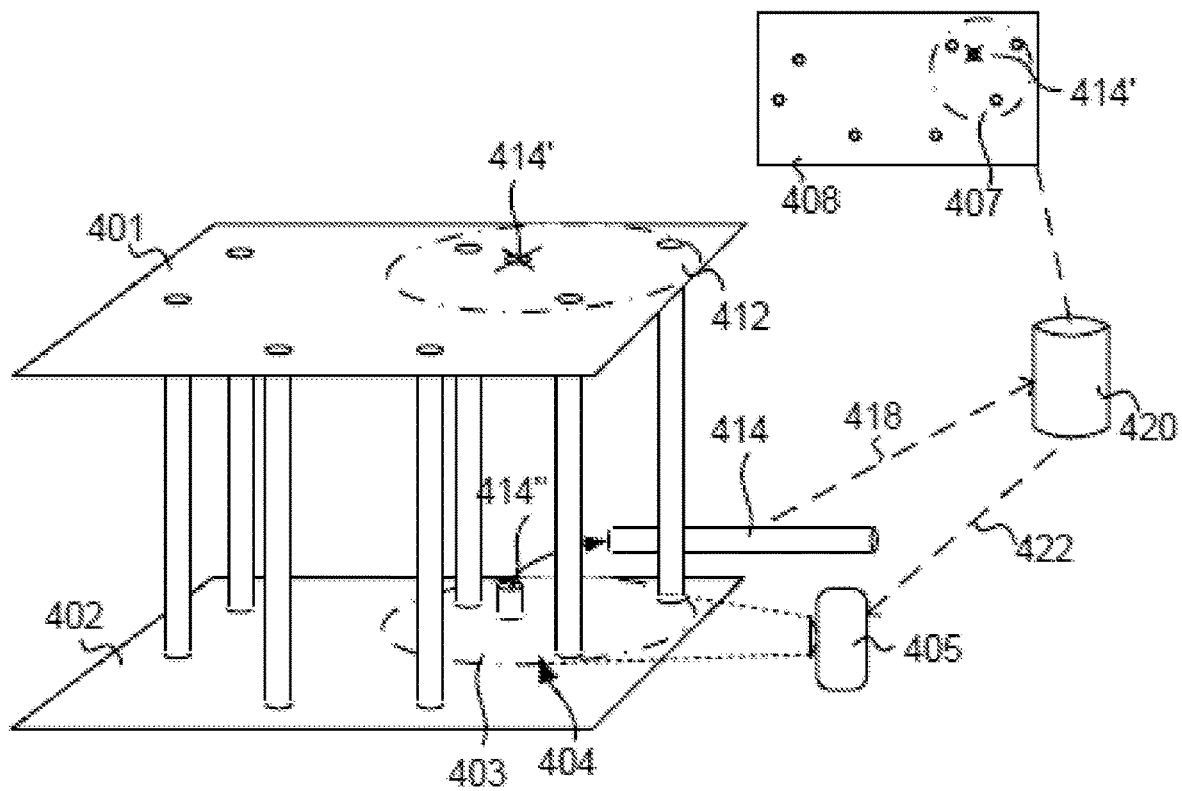
FIG. 5 schematically illustrates an embodiment including taking removed objects into account.

FIG. 5 illustrates, similar to FIG. 1, the principle, but with emphasis on that a known removed object 414 leaving registrable signs 414, 414' also is treated as one of the objects 404. An area 4011, 402 holds a plurality of objects 404. A first registration 408 of the objects 404 is made by a first device by registration and measurement means registers the objects 404 in the area 401 and can assign positions for respective object 404. Here, the first device is also able to register a lack 414' of an object 414 which is registered to have been removed. For example, the removed object 414 may be a tree which has been cut down. When cutting down the tree, the removal is registered and stored 418 in a database 420. When observing the forest from above, if the registration by the first device is made after the tree was cut, a gap may be present for one or more years such that the removal is registrable, and the position of the lack of the tree can be estimated by the first device. If the registration by the first device is made before the cut of the tree, the position of the tree is registered as discussed above, but the data may for example be tagged, e.g. by metadata, as removed. By accessing the database 420, the first device, or a second device 405, may get a previously stored position of the removed tree. The removed tree may thus be an object in the first registration 408, preferably tagged with information that it is a removed object. At ground level, the area 402 holds the same objects 404, wherein the removed object 414 may be registrable, e.g. as a stump 414" for the tree example. The second device 405 comprises registration and measurement means and a subset of the objects 404 within a sub-area 403 of the area 402 is registered, including the removed object 414. A second registration 407 of the subset of the objects is thus achieved, including an indication an indication of the object 414". By comparing the second registration 407 with the first registration 408, the subset of objects can be recognized, and since their positions are accurately determined by the first device, the second device 405 is enabled to acquire accurate positions for the respective objects and/or the second device 405.

Figure 6:
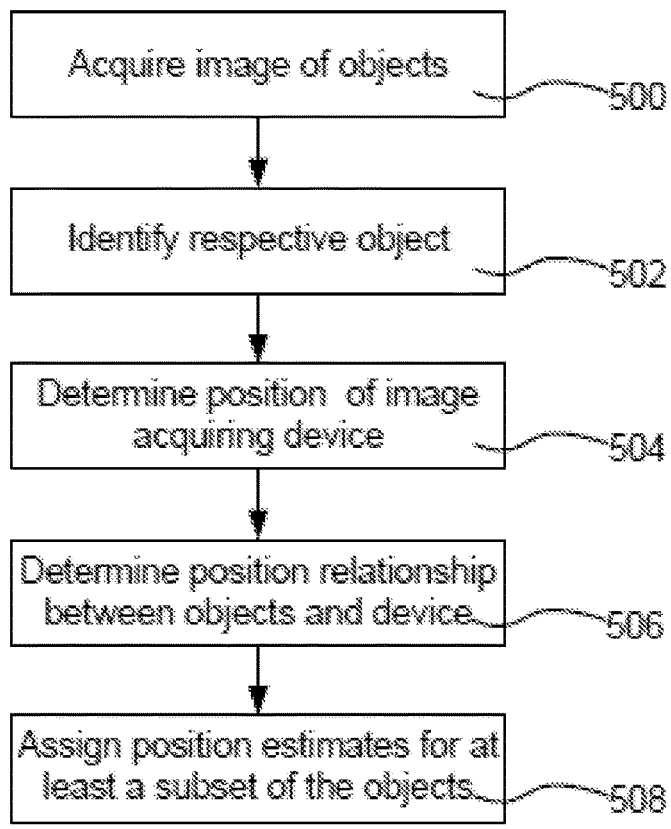
FIG. 6 is a flow chart illustrating a method for a first device according to an embodiment.

FIG. 6 is a flow chart schematically illustrating a method of a first device, i.e. the device making the accurate positioning measurement, e.g. against a GNSS, for providing a data set indicating positions of a plurality of objects. The method includes acquiring 500 an image of a plurality of objects. The acquiring 500 may be made by photographic imaging and/or laser scanning. The objects may be fairly static elements such as growing trees, construction or building elements, geological features, etc. The objects may also include a registered removal of an object leaving registrable signs, such as stumps, foundations, etc., of the removal, as discussed above. The objects, including any signs of removed objects, are identified 502 from the image. The position of the apparatus acquiring the image and at the time of acquiring the image is determined 504. A position relationship between the image acquiring apparatus and respective object is determined 506, which may be made by determining direction and distance between the respective object and the image acquiring apparatus. Here, one efficient way to do this is using laser, ultrasonic or radar ranging to the object and also aligning the directions, e.g. by compass direction. Here, a user may also interact through a user interface for enhancing the registration. From the determined position of the apparatus and the relationship in position between the apparatus and the respective object, position estimates are assigned 508 for at least a subset of the objects. Here, the subset may be considered as a part of identified objects being of the type and/or significance that is desired for the measurement, while objects left outside the subset are other objects that may be identified as not being part of the objects of interest. For example, a registration of construction elements at a construction site is intended. The image comprises the construction elements, but also temporal and/or movable elements such as cranes. The latter elements may thus be left outside the subset. Recognition of the elements to be left out may be made manually, but may also be made by image recognition performed by image processing using proper software and image processing circuitry.

Figure 7:
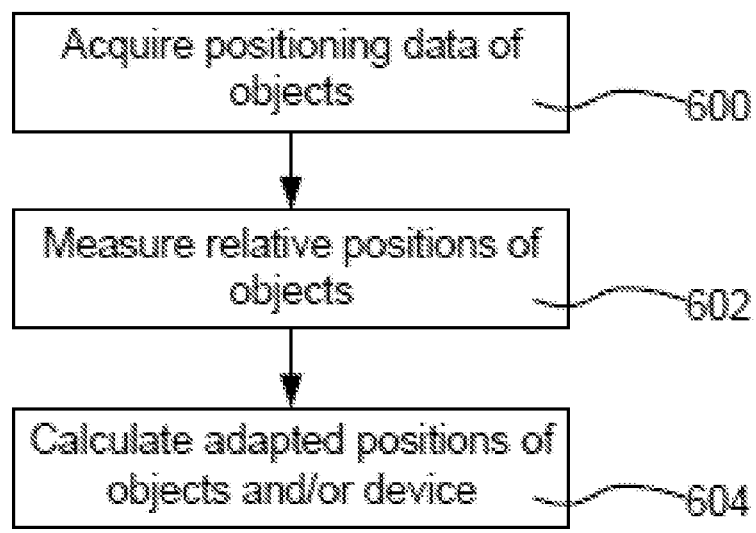
FIG. 7 is a flow chart illustrating a method for a first device according to an embodiment.

FIG. 7 is a flow chart schematically illustrating a method of a second device, i.e. the device used at ground level, for providing improved positioning of observed objects and/or the second device. This is performed by acquiring 600 positioning data of a plurality of objects. The second device is thus in possession of accurate positions of objects, and the task can be seen to identify which object is which of a number or objects observed at ground level. This is performed by measuring 602 relative positions of the observed objects. Absolute positions of the observed objects are then calculated 604 by comparing a mutual position representation of the observed objects with the positioning data of the plurality of objects, i.e. the accurate positions gained from the acquired 600 data set. This data set may be created according to the method demonstrated with reference to FIG. 6, and the examples provided with reference to FIG. 6 is also applicable for the method of the second device.

The acquiring 600 of the positioning data may be made from a database as demonstrated with reference to FIG. 2. The measuring 602 of the relative positions of the objects may include imaging of the objects, which may include one or more of photographic imaging, laser scanning, radar imaging, sonar or ultrasonic imaging. Here, it should be noted that the registration may also be made from more than one imaging of the object, i.e. using triangulation where the objects are observed from two or more positions to provide a more detailed and/or accurate representation of the positions of the objects. From a representation of the measured 602 relative positions of the objects and a representation of the acquired 600 positioning data, adapted positions are calculated 604, where the relative positions of the observed objects are substituted by the adapted positions representing the absolute positions of the respective observed objects. Thus, the second device is in possession of accurate absolute positions of the observed objects. Since the second device knows the mutual position to the observed objects, the absolute position of the second device may also be accurately estimated.

Registration of the determined positions, i.e. positions at ground level, for the objects may be made in a database for later use. That is, each object is given an accurate position. The database may be implemented as a server solution, e.g. as a cloud solution, which is accessible by a mobile device, or in the mobile device, to be used at ground level. According to a further variant, which may be combined with any of the above demonstrated embodiments, is to, in addition to the position data for respective object, store other metadata for the object, such as dimensions, time of registration, etc. Further metadata may be collected manually or automatically. Manually collected metadata may for example be data input by a user of the second device. Automatically collected data may be data that can be derived from e.g. the imaging at the registration, or later registrations of the same object. Such automatically collected data may for example be dimensions, kind, etc. The kind of object may for example what kind of tree, which may be estimated from the image data, e.g. based on texture, form (branches, twigs, leaves, etc.), and place of growth, etc. The estimation may be made from comparison with database content comprising samples of objects of different kinds. Another example is, based on e.g. texture registration, to estimate corrosion, maintenance needs, etc. for objects.

It is here to be noted that some or all of the above discussed collection of metadata for the objects need not be made at the same time as the positioning determination, and may also be made independent from the position determination, i.e. positions for the objects are not determined but registrations about the objects may be collected for example for statistics, value estimation, maintenance need estimation, etc.

In the examples given above, it has been assumed, for the sake of easier understanding, that objects are essentially vertical, i.e. position registered by the first device is the same as position registered by the second device. However, some objects may not be fully vertical, wherein a position registrable by the first device deviates from a position registrable by the second device for the same object. Such object may for example be leaning a bit, or may not be fully straight. Such objects may be taken into consideration by adjusting at least one of the first registration or the second registration. This adjustment may include changing the position data in one or both of the registrations, or by adding data, e.g. as metadata, for the object such that the matching procedure can take the deviation into account.

The deviation may also be determined with aid of the matching process. For example, x objects are registered by the second device. Upon matching the second registration with the first registration, x-y objects match to a predetermined degree, where y is (significantly) less than x. The second device may then present a result to the user of the second device which may include identification of the y objects that are not matching. This presentation may for example be made as a hybrid image formed from the image made at the registration by the second device and an overlay image identifying they objects. A user may then confirm that one, more or all of the y objects are properly registered, but that the objects, e.g. manually marked by the user on the hybrid image, are not fully vertical. An adjustment, according to any of the above discussed alternatives, is then made and may be used for later use.

Figure 8:
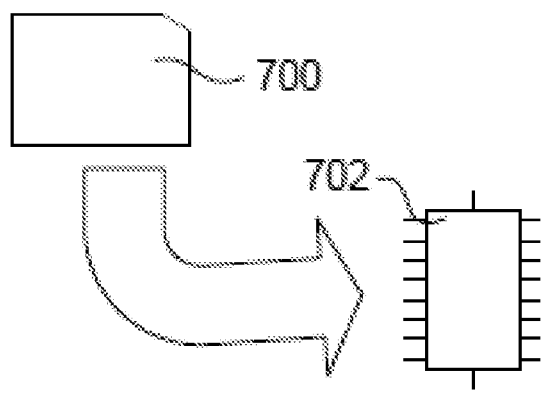
FIG. 8 schematically illustrates a computer-readable medium and a processing device.

The methods according to the present invention is suitable for implementation with aid of processing means, such as computers and/or processors, especially for the case where the processing elements demonstrated above comprises a processor handling for example the calculation of the adapted positioning estimate. Therefore, there is provided computer programs, comprising instructions arranged to cause the processing means, processor, or computer to perform the steps of any of the methods according to any of the embodiments described with reference to FIG. 1 to 7. The computer programs preferably comprises program code which is stored on a computer readable medium 700, as illustrated in FIG. 8, which can be loaded and executed by a processing means, processor, or computer 702 to cause it to perform the methods, respectively, according to the embodiments demonstrated herein, preferably as any of the embodiments described with reference to FIGS. 1 to 7. The computer 702 and computer program product 700 can be arranged to execute the program code sequentially where actions of the any of the methods are performed stepwise, and/or be arranged to execute the program on a real-time basis, e.g. based on when and what information that is available and/or required. The processing means, processor, or computer 702 is preferably what normally is referred to as an embedded system. Thus, the depicted computer readable medium 700 and computer 702 in FIG. 8 should be construed to be for illustrative purposes only to provide understanding of the principle, and not to be construed as any direct illustration of the elements.

According to an embodiment, a computer program for a first device, according to what is demonstrated above, is arranged to be downloaded into a device comprising memory, processor and interfaces, wherein the interfaces are arranged to interact with positioning means and imaging means, and possibly other sensors, as demonstrated above, for collecting data about a plurality of objects within an area as demonstrated with reference to e.g. FIG. 1.

According to an embodiment, a computer program for a second device, according to what is demonstrated above, is arranged to be downloaded into a device comprising memory, processor and imaging means, and preferably also some positioning means, and possibly also other sensors, as demonstrated above, for measuring relative positioning data of a number of objects which are observed as demonstrated with reference to e.g. FIG. 1.

The programs may for example also be downloadable from a site providing so called apps, or be provided on a non-transitory computer-readable medium 700.

In the examples given above, it has been assumed, for the sake of easier understanding, that objects are essentially vertical, i.e. position registered by the first device is the same as position registered by the second device. However, some objects may not be fully vertical, wherein a position registrable by the first device deviates from a position registrable by the second device for the same object. Such object may for example be leaning a bit, or may not be fully straight. Such objects may be taken into consideration by adjusting at least one of the first registration or the second registration. This adjustment may include changing the position data in one or both of the registrations, or by adding data, e.g. as metadata, for the object such that the matching procedure can take the deviation into account.

The deviation may also be determined with aid of the matching process. For example, x objects are registered by the second device. Upon matching the second registration with the first registration, x-y objects match to a predetermined degree, where y is (significantly) less than x. The second device may then present a result to the user of the second device which may include identification of the y objects that are not matching. This presentation may for example be made as a hybrid image formed from the image made at the registration by the second device and an overlay image identifying they objects. A user may then confirm that one, more or all of the y objects are properly registered, but that the objects, e.g. manually marked by the user on the hybrid image, are not fully vertical. An adjustment, according to any of the above discussed alternatives, is then made and may be used for later use.

The inventors have furthermore identified one more problem that may be solved by the teachings herein. The problem relates to surveying large forest areas. The proposed solution may also be applied to other forms of geo surveying and its use is not restricted to forestry related surveying.

Traditionally when surveying large areas the large area will be surveyed in parts or partial areas which partial areas are then stitched together to form the large area. This technique is also used to stitch together old surveys with new surveys. To identify the different partial areas markers are used. The markers, being uniquely marked with a shape or an identifier, will identify the positions of the partial areas as well as how the areas should be aligned to oneanother if more than one marker is used, simply by aligning the markers in the different surveys or rather results of the surveys Using markers not only requires manufacturing, transporting, installing/mounting the markers and making sure that the markers are visible or otherwise identifiable at the time of a (partial) survey, but also requires planning in where to locate them, how many should be used and what kind should be used. As there are many different surveying techniques available, there are also many different marker standards available.

The logistics involved and the planning becomes a problem especially in remote areas and areas that have not previously been surveyed and this amy require a lot of man power and also take a long time as some places where a marker should be put may be very difficult to reach.

The inventors have realized that these problems can be solved or at least mitigated by the fact that trees, and especially groups of trees, are unique in their appearance and also their individual placement. This is especially true for unplanned forest where threes and such grow in irregular patterns.

Thus by using the teachings herein, which provide a manner for marking the relative position of individual trees or other objects, a first (partial) area may be matched to a second (partial) area as relates to relative position and alignment, by finding a set of trees, comprising at least one tree, in said first (partial) area and match this set to a set of objects in said second (partial) area are therefore proposing.

For a set comprising more than one tree, this manner only requires one set to be matched, as the arrangement of trees (or other objects) within the set will also provide for how the first and second areas are aligned with relation to one another.

Figure 9:
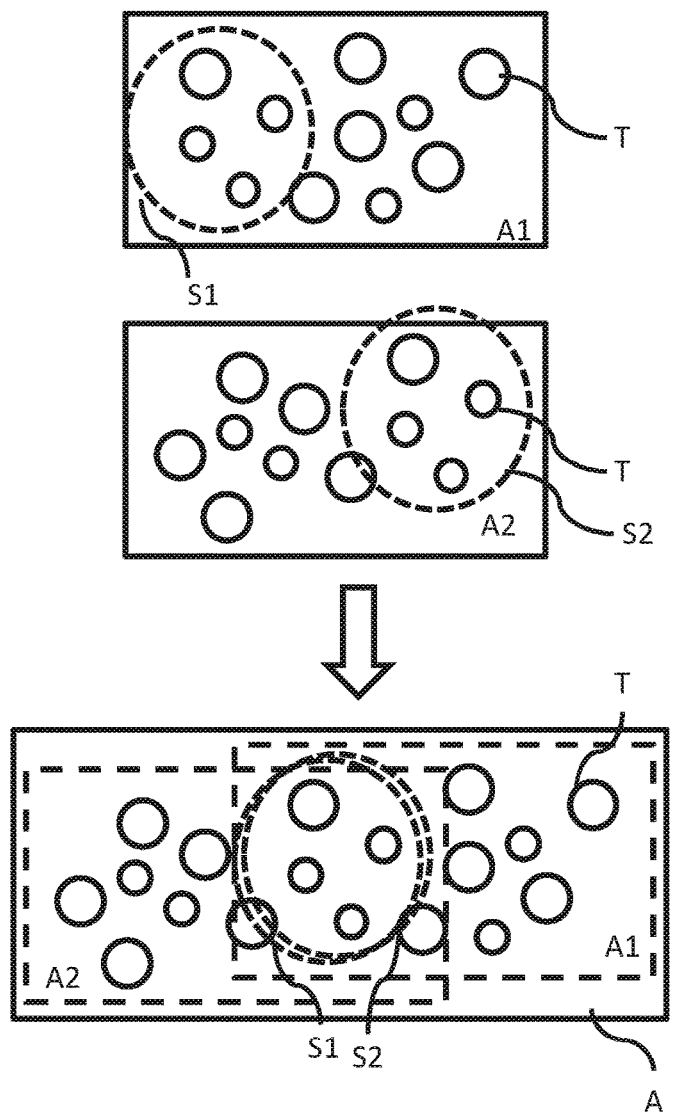
FIG. 9 shows a schematic view of a first area and a second area that are to be stitched together to form a composite area according to one embodiment.
Figure 10:
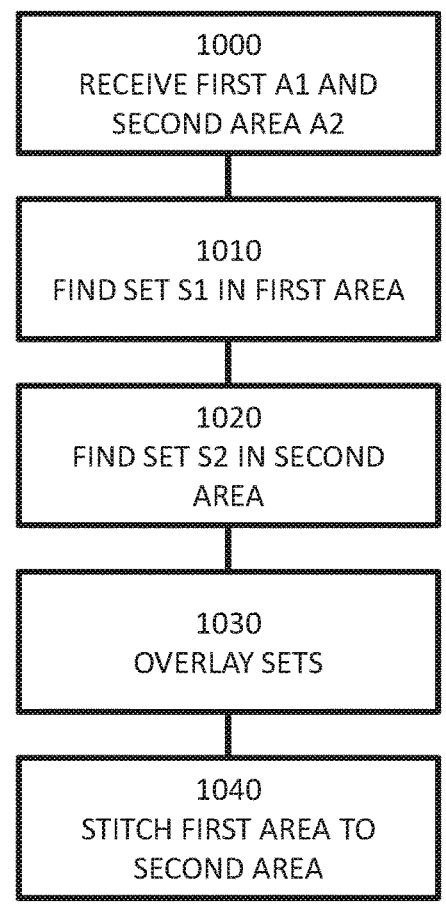
FIG. 10 is a flow chart illustrating a method for a device according to an embodiment.

FIG. 9 shows a schematic and exemplary view of a first (partial) area A1 and a second (partial) area A2 that are to be stitched together to form a composite area A. It should be noted that the manner may be used for stitching together areas from different surveys as well as partial areas from the same survey. In the following the areas will simply be referred to as areas, which include both partial areas of one survey as well as surveys from different surveys. FIG. 10 shows a flowchart for a method according to the teachings herein, where a first area A1 and a second area A2 are to be matched and stitched together. The areas A1, and A2 have previously been analyzed to find the individual relative positions of the objects, in this example being trees T. The individual relative positions thus being the positions of the objects with regards to one another. In one embodiment, the size of at least one object is also provided by the analysis. The method thus begins with receiving 1000 a first area A1 and second area A2, where the individual positions of the objects in the areas are given. As the areas have been received, a set of objects S1 is to be found in the first area A1. The set may be chosen at random as simply being a set of at least one tree. However, in one embodiment the set is selected to be a set of objects at an edge of the area. This enables for a more likely matching to another area as the two areas most likely overlap along an edge.

In one embodiment the set is selected as a set of objects having an irregular pattern, wherein irregular herein means that it is not similar to the surrounding patterns of objects.

As a first set S1 has been found, a second set S2 is found 1020 in the second area A2.

The second set S2 is found by finding a set of objects that correspond to the first set S1, whereby a matching of the two sets and therefore also the two areas is achieved.

In one embodiment, the first set S1 and the second set S2 are found as a set of objects that exist in both areas.

The sets are found to be matching by comparing characteristics of the objects. The characteristics may be the size of the object(s), the individual position(s), the actual position of an object, tree species (kind of trees), branch structure, shape, profile, vertical bole transaction, barch texture or pattern, tree height and/or other characteristics such as discussed above.

In one embodiment, a time factor is also applied to accommodate for continued growth. For example, a tree having a specific height or width at one year will have an expected height or width at a subsequent year which may be determined using normal growth rates. As such, profiles, heights and/or widths may be adapted accordingly during the comparison to find matches.

In one embodiment, the comparison is done without relation to the scale, where only relative characteristics, such as relative sizes and/or distances between objects are taken into account, or alternatively or additionally, only the actual position of an object is taken into account. This provides for a manner of rescaling one or both of the two areas to provide a scaled stitching into a composite area.

The scaling may be done by scaling the area(s) to be scaling so that the corresponding set corresponds to the other set. Or, when a set is found by finding matching sets(s) in the two areas, the scaling is done so that such a set may be found.

The scaling may also be done according to scaling information received along with the area information. Such scaling information may also be determined by comparing the absolute positions of two objects in an area.

As the two sets S1, and S2 have been found in the two areas A1, A2, The relative positions of the two areas may be determined 1030 by overlaying the two sets S1 and S2 and the two areas may be stitched 1040 together to form a composite area A.

Figure 11:
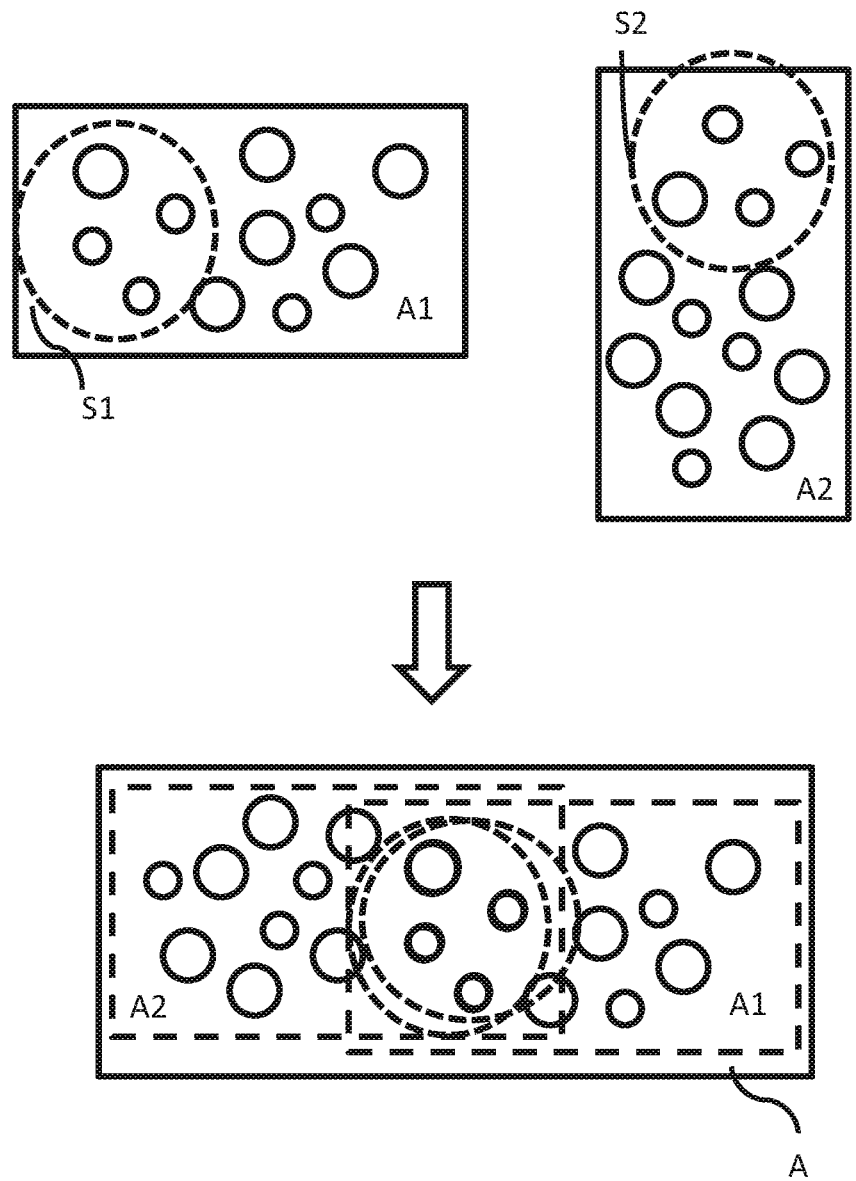
FIG. 11 shows a schematic view of a first area and a second area that are to be stitched together to form a composite area according to one embodiment.

In one embodiment, a rotation of one or both of the areas is also performed before stitching in order to overlay the two sets, see FIG. 11. The rotation may be done by rotating the area(s) to be rotated so that the corresponding set corresponds to the other set. Or, when a set is found by finding matching sets(s) in the two areas, the rotation is done so that such a set may be found.

The rotation may also be done according to compass or other directional information received along with the area information. Such directional information may also be determined by comparing the absolute positions of two objects in an area. In this context an area may be taken to correspond to a plurality or set of objects. As the objects have a position, they also cover an area, whereby the two terms effectively may be regarded as interchangeable.

As previously stated this may be used to stitch partial areas for forest surveys, but may also be used for other surveys. It may be used to stitch areas belonging to the same overall survey, or to stitch newer surveys to older surveys.

The invention claimed is:

1. A method of adjusting positioning data, the method comprising:
   acquiring positioning data obtained from a first registration for a plurality of objects having mutual constant positions;
   measuring relative positions for at least a subset of the plurality of objects in a second registration; and
   calculating an adapted measurement position for at least one of the objects of the subset of the plurality of objects by correlating the measured relative positions from the second registration for the at least a subset of the plurality of objects with the acquired positioning data from the first registration, wherein the adapted measurement position is based on the acquired positioning data,
   wherein the acquired positioning data from the first registration is a file comprising the positions for the respective object, wherein the positions are determined from above at a higher altitude than from a ground level altitude on which the measurement of the relative positions for the at least a subset of the plurality of objects is made in the second registration, and
   wherein the method further comprises finding a first set in a first plurality of objects, and finding a matching second set in a second plurality of objects and by overlaying the first set and the second set, stitching together the first plurality of objects with the second plurality of objects.

2. The method of claim 1, wherein the measuring of the relative positions for the at least a subset of the plurality of objects comprises measuring mutual distances and directions between individual objects.

3. The method of claim 2, wherein the measuring of the distances between the individual objects comprises
   registering the objects by a camera;
   triangulation between the objects; or
   laser scanning of the objects; or
   any combination thereof.

4. The method of claim 3, further comprising interaction, for adapting the measurement, by a user of a device performing the method.

5. The method of claim 1, wherein the objects are any one or more of
   growing trees;
   construction elements; and
   geological features.

6. The method of claim 1, wherein at least one of the objects comprises a removed object providing a registerable sign of the removal.

7. The method of claim 1, wherein the first registration is obtained through a first device, wherein the second registration is obtained through a second device, and wherein the first device is a flying device and the second device is a ground device.

8. A non-transitory computer readable medium encoded with a computer program comprising computer executable instructions which when downloaded and executed by a processor of a device, causes the device to perform operations comprising:
   acquiring positioning data obtained from a first registration for a plurality of objects having mutual constant positions;
   measuring relative positions for at least a subset of the plurality of objects in a second registration; and
   calculating an adapted measurement position for at least one of the objects of the subset of the plurality of objects by correlating the measured relative positions from the second registration for the at least a subset of the plurality of objects with the acquired positioning data from the first registration, wherein the adapted measurement position is based on the acquired positioning data,
   wherein the acquired positioning data from the first registration is a file comprising the positions for the respective object, wherein the positions are determined from above at a higher altitude than from a ground level altitude on which the measurement of the relative positions for the at least a subset of the plurality of objects is made in the second registration, and
   wherein the operations further comprise finding a first set in a first plurality of objects, and finding a matching second set in a second plurality of objects and by overlaying the first set and the second set, stitching together the first plurality of objects with the second plurality of objects.

9. A device for measuring positions of a plurality of objects, the device comprising:

a memory arranged to store positioning data obtained from a first registration for the plurality of objects having mutual constant positions;

an input interface arranged to obtain measurement data of relative positions for at least a subset of the plurality of objects in a second registration; and a processor arranged to calculate an adapted measurement position for at least one of the objects of the subset of the plurality of objects by correlating the measured relative positions for the at least a subset of the plurality of objects with the stored positioning data, wherein the adapted measurement position is based on the positioning data, wherein the positioning data is acquired as a file, having data suitable to be stored in the memory, comprising the positions for the respective object from the first registration, wherein the positions are determined from above at a higher altitude than from a ground level altitude on which the measurement of the relative positions for the at least a subset of the plurality of objects is made and wherein the measurement of the relative positions for the at least a subset of the objects includes mutual distances and directions between individual objects, and wherein the processor is further arranged for finding a first set in a first plurality of objects, and finding a matching second set in a second plurality of objects and by overlaying the first set and the second set, stitching together the first plurality of objects with the second plurality of objects.

10. The device of claim 9, wherein the input interface is connected to:

a camera arranged to register the objects;

an optical instrument arranged to determine the mutual distances and directions by triangulation between the objects;

a laser scanner arranged to scan the objects; or a user interface; or any combination thereof, and wherein the user interface is arranged to enable interaction by a user for adapting the measurement data.

11. The device of claim 10, wherein any one of the camera, the optical instrument, the laser scanner, and the user interface is a part of the device.

12. The device of claim 10, wherein any one of the camera, the optical instrument, and the laser scanner is a remote entity connected to the device.

13. The device of claim 9, wherein the first registration is obtained through a first device, wherein the second registration is obtained through a second device, and wherein the first device is a flying device and the second device is a ground device.

* * * * *